Nov. 12, 1963 S. S. CARLTON 3,110,631
FUEL CELL CONSTRUCTION
Filed Aug. 1, 1960 2 Sheets-Sheet 2
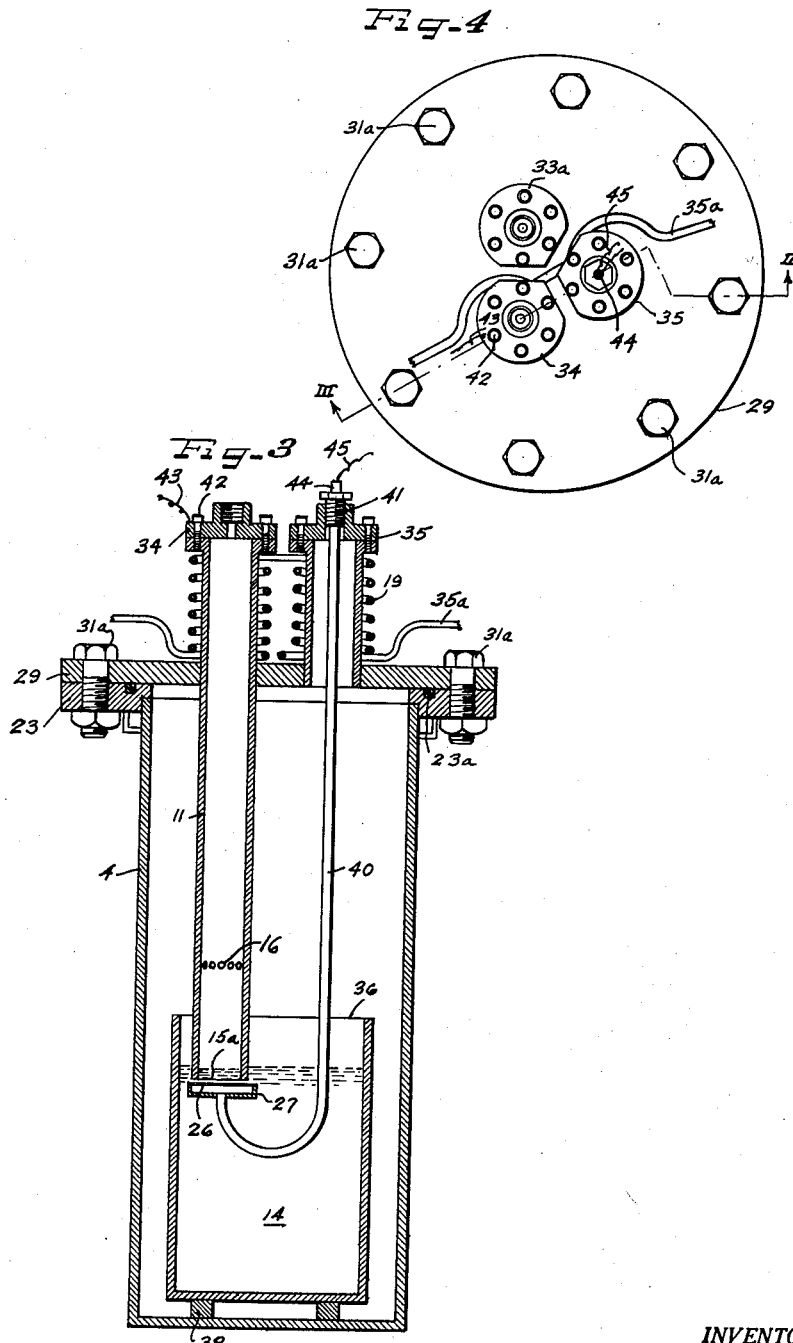
INVENTOR.
Stuart S. Carlton
BY
ATTORNEYS

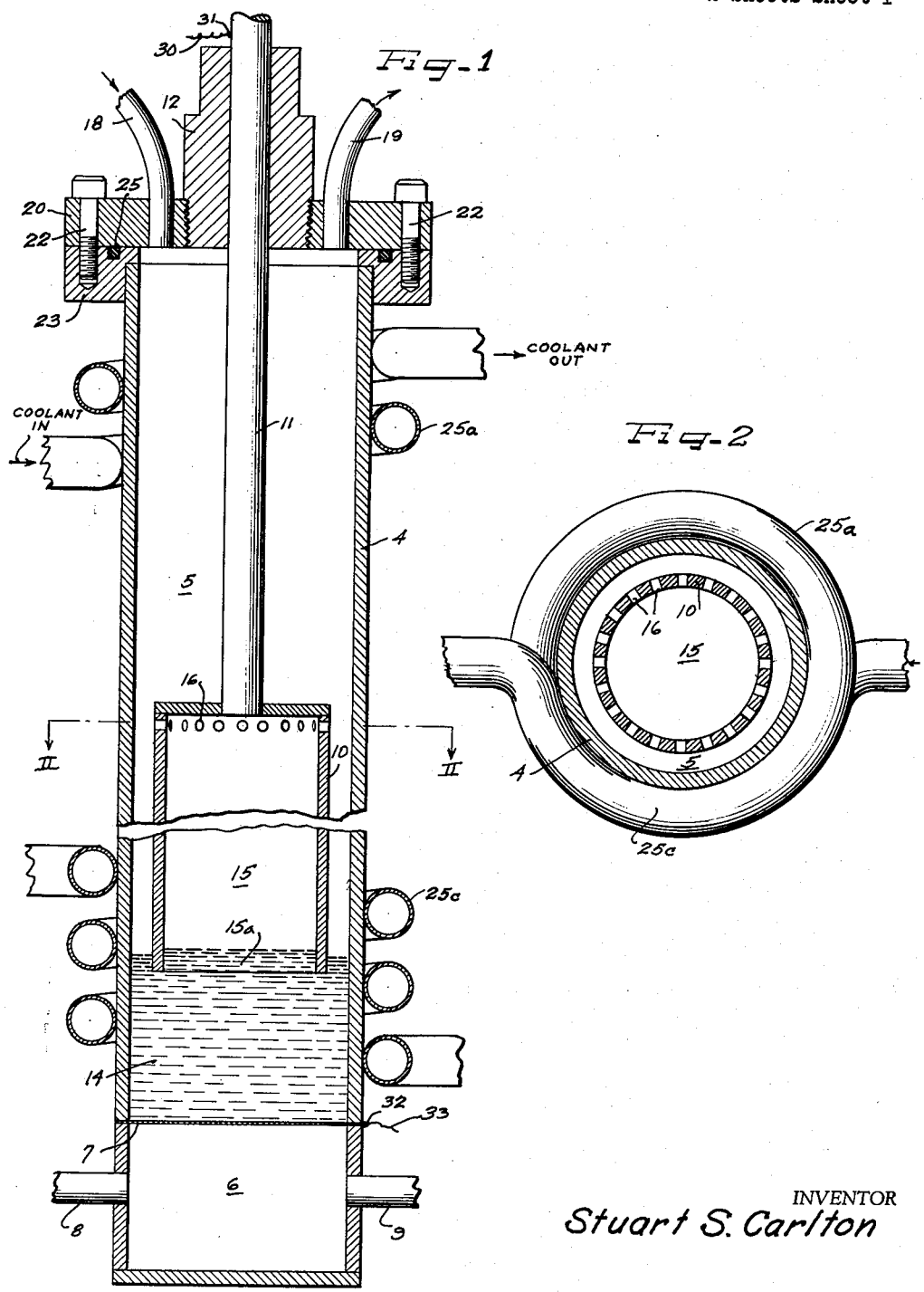

3,110,631
FUEL CELL CONSTRUCTION

Stuart S. Carlton, Parma, Ohio, assignor to Thompson Ramo Wooldridge Inc., Cleveland, Ohio, a corporation of Ohio
Filed Aug. 1, 1960, Ser. No. 46,642
1 Claim. (Cl. 136—86)

The present invention relates to a method and means for converting chemical energy into electrical energy and is more particularly concerned with improved methods and an electrochemical cell for generating electrical energy.

Electrochemical or "voltaic" cells, which convert chemical energy directly into electrical energy are well known in the art. Fuel cells are a form of voltaic cell, and differ from the more common storage battery cells in that the reactants of the former cells are continuously fed into the cell from external sources.

Through proper selection of the fuel cell reactants, the by-products formed in the reaction may be removed from the electrolyte as they are formed and, thus, there is no degeneration or weakening of the reaction so long as reactants are continuously fed into the cell.

In some electrochemical cell systems, it has been possible to choose reactants whereby the reaction by-products may be regenerated into the original reactants by the application of simple forms of energy, such as heat, light, or nuclear radiation. Thus, by employment of such regenerative type fuel cell systems, the possibility exists for operation thereof over indefinite periods of time with only the single requirement for a simple energy source.

The importance of such regenerative fuel cell systems may be readily appreciated when one considers the applications possible therefor in orbiting satellites, guided missiles, rockets, and related ground and nautical applications.

It has been customary, in the prior art to employ gaseous reactants at one or both of the electrodes of these electrochemical fuel cell systems for a number of reasons, i.e., specialized electrochemical requirements, the problems associated with cost and handling of the variety of usable reactants, and the formation and handling requirements of reactant by-products.

The commonest type of fuel cell system presently employed is that using hydrogen and oxygen, with an electrolyte consisting of water and a strong base.

In the prior art fuel cell systems employing gaseous reactants and a liquid electrolyte, there must be present at the gaseous electrodes a state or condition wherein the gas reactants and electrolytes may contact in the presence of an electrically-conducting medium (the electrode), so that the ions formed may be readily diffused or be readily removed from the area of ionization, and so that the released electrons may be readily removed from the reaction zone through the external circuit, which comprises the useful "loading" of the cell. It is furthermore necessary to control rather closely the reaction conditions so that the gas-electrolyte interface is at the surface of the electrodes. These reaction conditions have been generally met in the prior art by employment of electrodes constructed of porous, electrically-conductive materials, such as porous carbon, graphite and sintered metal powders.

Employment of such porous electrodes, however, has created design limitations attributable primarily to the physical properties of such materials. The state of the art in the development of such porous electrode materials is not such as to provide electrodes of uniform density throughout the material of construction. Thus the electrode materials are sensitive to fuel cell system operating pressure, hydrostatic pressures, and, for space applications, the attitude of the porous member in relation to the earth or to external forces thereby affecting operation of the cell system.

Furthermore, the hydrogen or other gaseous reactant, when pumped or fed through compressors into the gaseous fuel chamber of the cell system through the porous electrode, is subject to non-uniform pressure flow as well as to the pressure differentials existing across the porous electrode. It has generally been necessary, therefore, to devise sensitive pressure regulators to control supply of the gaseous reactant into the fuel cell system in an attempt to minimize these problems.

The major disadvantage inherent in the use of such porous materials as electrodes for fuel cell applications resides in the fluid affinity of the electrode apertures or capillaries. The electrolyte fuel fluid medium tends to wet the contacting surface of the electrode and is thus drawn into the capillaries of the electrode. After this condition is established, the reactant ions must forcibly diffuse through the electrode capillaries to the surface of the electrode before the desired reaction zone is reached. As a result, this diffusion process is relatively slow and, under such a condition of force diffusion, only a negligible amount of current is derived from the electrochemical cell system. These characteristics of wetting and forced diffusion through the capillaries of the electrodes are commonly referred to in the art as "flooding."

In spite of great advances in metallurgical techniques, a porous electrode as yet has not been developed which is of such uniform density, that, under pressure conditions sufficient to overcome the aforementioned capillary action, there will be no sporadic bubbling of the electrolyte in adjacent local regions of lower density.

While under normal conditions, a slight bubbling effect thus caused is not considered critically deleterious with respect to performance of such cell systems, it will be appreciated that for satellite or any extra-terrestrial applications where zero-gravity conditions exist, the gas and electrolyte would tend to mix into a forth as a result and prevent proper cell functioning. Attempts heretofore made to minimize flooding include the application of lyophobic coatings for the electrodes. However, such coatings have been found to be effective only for limited periods of time and thus have restricted application.

As indicated above, a major materials problem, facing designers of such fuel cell systems, particularly for long term operations, is that of the electrode flooding.

By employment of my invention wherein a permeable metal of uniform density which is non-reactive with either the electrolyte or gaseous reactants is utilized rather than a porous electrode, I effectively overcome the problems of the prior art and substantially eliminate flooding of the electrode, frothing, bubbling, or other mechanical escape of the reactant gas into the cell chamber, provide a fuel cell system having electrodes insensitive to cell operating pressures, hydrostatic pressures, and attitude in relation to the earth or external forces, provide a device relatively insensitive to pressure differentials thereacross thereby eliminating the requirement for pressure control means for the gaseous reactants, provide lighter weight and more compact electrodes (which may be considered a major factor in utilization of such devices in aircraft or space vehicles), achieve high density uniformity and constant permeability of the electrode and elimination of the requirement for lyophobic coatings.

It is therefore among the objects of the present invention to provide new and improved electrochemical cell systems.

It is another object of the present invention to provide electrochemical cell systems employing electrodes unaffected by the physical properties of the electrolyte used in the cell.

It is still another object of the present invention to provide electrochemical cell systems employing a permeable metal electrode of substantially uniform density and substantially free of capillary flooding and surface bubbling.

It is an additional object of the present invention to provide electrochemical cell systems having a metal diaphragm electrode operatively insensitive to cell pressures and hydrostatic pressures.

It is a further object of the present invention to provide electrochemical cell systems having electrodes of uniform permeability heretofore unobtainable with porous material electrodes.

It is another object of the present invention to eliminate the requirement for lyophobic coatings for electrodes of electrochemical cell systems.

It is another object of the present invention to provide electrochemical cell system electrodes, the performance of which is less adapted to be affected by gravity or zero-gravity conditions.

It is a further object of the present invention to provide electrochemical cell systems which are simple, lightweight and compact in construction and efficient in operation.

These and other objects, features and advantages of the present invention will become apparent upon a careful consideration of the following detailed description, when considered in conjunction with the accompanying drawing illustrating embodiments of the concepts of my invention, wherein like reference characters and numerals refer to like or corresponding parts throughout the several views.

On the drawing:

FIGURE 1 is a view in cross section illustrating an embodiment of an electrochemical cell system constructed in accordance with the principles of my invention;

FIGURE 2 is a view in partial elevation taken along the lines II—II of FIGURE 1;

FIGURE 3 is a fragmentary view in cross section illustrating a modified embodiment of my invention; and FIGURE 4 is a fragmentary top plan view of the embodiment of FIGURE 3.

Briefly stated, my invention relates to an electrochemical cell system employing at least one gaseous reactant and a thin foil electrode of a metal permeable by said gaseous reactant. The metal foil is substituted for the conventional type porous carbon, graphite or sintered metal powder electrodes. The metal electrode is preferably in the form of a thin diaphragm, sealed to a suitable housing as by welding, brazing, or any other suitable securing means, to define a leakproof chamber for distribution of the gaseous reactant uniformly over the entire surface of the diaphragm. Suitable electrical insulation is also provided to enable the electrode or electrodes to maintain their respective polarity or polarities.

The size and shape of the diaphragm and gaseous reactant chamber are not critical, except insofar as they relate to the geometry of the electrochemical cell system itself. The diaphragm itself may be flat, round or spherical; and complex shapes are contemplated within the scope of the present invention.

It will be appreciated, of course, that the rate of diffusion of the gas through the permeable metal foil is dependent on the thickness of the metal diaphragm, upon temperature conditions, and, for the present application, such diffusion becomes appreciable at elevated temperatures.

The concepts of the present invention will be described in terms of an electrochemical cell system employing hydrogen gas as the single gaseous reactant; however, other suitable gaseous reactants, such as oxygen, are not to be excluded in the present invention.

The diffusion or permeability potential of hydrogen gas through most materials of construction is well known. Certain metals, including but not limited to, iron, platinum, palladium, vanadium and niobium are notable in their ability, when compared with other metals to permit diffusion of hydrogen, particularly at elevated temperatures. The exact diffusion mechanism is not precisely known nor have any theories thereof been substantiated; however, a theory has been advanced that the diatomic hydrogen molecule, $H_2$, disassociates in some manner to the monatomic hydrogen on the inlet surface of the metal body and diffuses while in this state to the outlet surface, where it is said to recombine to the diatomic hydrogen state.

The rate of gaseous diffusion, of course, is, as stated dependent upon many variables, including the purity of the diffusion medium, the thickness thereof, the temperatures involved, the metallurgical properties and characteristics of the diffusion medium and the relative hydrogen concentration at opposed sides of the permeable medium.

The electrochemical cell systems shown in the drawing of the present invention contemplates at least one gaseous reactant, such as hydrogen, and a non-gaseous reactant, such as molten lithium metal, and as the electrolyte, selected fused salts, such as purified lithium chloride and purified lithium fluoride. Lithium was chosen as the non-gaseous reactant for purposes of the following discussion since the hydrogen reactant by-products thereof, lithium hydride, decomposes thermally at temperatures of the order of 850° C. to yield its components, lithium and hydrogen, which may be recirculated in the system and thus reused. Of course, depending upon the particular application involved, various compatible ion reactant sources and other salt electrolytes may be employed.

Because lithium metal (always present in the above electrolyte to a small degree) is reactive with many metals, niobium was chosen as the metal foil diaphragm electrode for purposes of illustration; however, other metals such as palladium, platinum, iron, and other metals may be employed. For example, the refractory metals including, in addition to niobium, titanium, zirconium, beryllium, tantalum, and vanadium, which are resistant to a substantial extent to attack by molten lithium, may be utilized. It will be appreciated that conditions must be controlled by choosing those metals, the hydrides of which are unstable at the temperature of operation, in order for the electrode metal to retain its identity; otherwise the electrode would be converted to its hydride which is of little or no value in this application.

As appears in FIG. 1, an electrochemical cell unit constructed in accordance with the principles of the present invention may comprise an outer shell 4 separated into a pair of chambers 5 and 6 by a foil diaphragm 7 of niobium or other suitable metal foil. Chamber 6 is the hydrogen gaseous reactant chamber and communicates with both an inlet port 8 and an outlet port 9 formed in the outer shell 4.

The cylindrical outer shell 4 may be constructed of stainless steel, or of any metal having suitable thermal and mechanical properties and being non-reactive with the fuels and electrolyte, and, with the diaphragm 7, comprises the cathode of the electrochemical cell.

The anode of the system may comprise a cylindrical bell-shaped member 10 open at its bottom end and constructed of a material non-reactive with either the electrolyte or molten lithium reactant, such as stainless steel. The bell 10 is supported in the chamber 5 by a lithium feed tube 11 which extends through an insulating bushing or fitting 12. As shown, the bell-shaped member 10 is positioned in chamber 5 with its open end partially immersed in the electrolyte 14 and thus defines means for confining the molten lithium metal pool in the bell chamber 15 preventing dispersion of the metal pool across the entire surface of the electrolyte, which pool is designated 15a.

A plurality of pressure equalizing apertures 16 are formed in the upper portion of the bell or cylindrical anode 10.

To illustrate the enhanced voltage outputs obtained, an electrolyte 14 consisting of 72.2 grams of purified lithium chloride and 19.3 grams of purified lithium fluoride was introduced into the chamber 15 and melted under argon atmosphere at a temperature of 630° C. For this purpose, conduits 18 and 19 communicate with chamber 15 through the end cap 20 of the electrochemical fuel cell for the introduction and discharge of the argon gas. The end cap 20 may be secured by bolts 22 or by any other suitable means to a flange 23 provided on the outer cylindrical shell 4 of the cell system. Seal means 25 are provided to assure a leak-tight fitting between the end cap and flange 23.

The lithium metal was introduced through the feed tube 11 and being of relatively lighter specific gravity than the fused salt electrolyte floated thereon within the confines of chamber 15. Hydrogen gas was admitted to chamber 6 from a source (not shown) and diffused through the niobium foil diaphragm. To connect the anode and cathode to a voltage indicating device (not shown), the anode may be suitably connected thereto by a line 30 and terminal 31. Similarly the cathode may be connected directly by a terminal 32 and line 33.

A potential of 0.52 volt was developed between the electrodes with the system shown in FIG. 1. A 50 minute test run indicated that the potential would remain during such period between the values of 0.5 and 0.41 volt. The hydrogen flow was then terminated. As a result the voltage dropped to a value of 0.086.

To further vary the test conditions, hydrogen was then readmitted to the cathode chamber 6 with a resistance of 1.10 ohms in the external circuit and the potential rose to a steady value of 0.24 volt, where it remained for a period of 15 minutes. The resistance was then removed and the voltage rose to a value of 0.32 volt. The voltage remained at this level until the test was terminated. Following the test, the cell was cooled and washed clean. The niobium electrode, upon inspection, was clean, bright and intact.

In order to generate sufficient heat, of an order of magnitude of 550° C., for maintaining the electrolyte in the fluid state, the complete assembly may be placed in a furnace of conventional construction. Additionally, cooling means 25a may be employed to maintain the upper portion of the cell cool for preventing burning of the electrical insulation and gasket 23a.

Alternatively, heating means 25c, such as glow bars or "Calrods," may be provided for maintaining uniform heating of the fuel cell reaction area as may steam lines.

FIGURE 3 illustrates a modified arrangement of a fuel cell constructed in accordance with the principles of my invention wherein parts identical to the parts of the apparatus of FIGURE 1 are identified by the same reference numeral.

The fuel cell, as appears in FIGURE 3, includes a housing 4, which may be cylindrical in shape, provided at the upper end with a flange 23. A gas-tight metal cover plate 29 is secured to flange 23 by suitable means such as screws 31a. The cover plate is bored to receive the anode bell 11, preferably constructed of stainless steel, and the inert atmosphere inlet conduit 18 and outlet conduit 19. Suitable fittings 33a, 34 and 35 are provided to adapt the respective inlets and outlets for communication with the argon supply source, argon outlet reservoir, electrolyte supply source (not shown), and the lithium supply source (not shown). A terminal 42 and line 43 and terminal 44 and line 45 may be provided for the anode and cathode respectively, as shown.

The cover plate gasket may be appropriately water cooled by suitable means 35a.

A receptacle 36 is provided for the electrolyte which may be fed to the receptacle through one of the three conduits 11, 18 or 19. To assure uniform heating of the electrolyte receptacle, a pedestal or platform 38 may be provided.

A cathode consisting of a stainless steel conduit 40 is provided with a niobium diaphragm 26 secured across the top of a cylindrical stainless steel housing 27 as by welding. The cathode is secured through a non-conductive sleeve 41 in conduit 19 and has its active end inserted in the electrolyte adjacent the anode conduit 11 as clearly appears in FIGURE 3.

An electrolyte 14 comprising 3450 grams of purified lithium chloride-lithium fluoride salt in an eutectic proportion of 79% lithium chloride and 21% lithium fluoride, by weight, was supplied to the receptacle 36 and melted. The lithium metal 15a was added through the conduit 11 in reaction proportion and, when placed in a furnace, the electrolyte and lithium metal were heated to a temperature of about 550° C. in an argon atmosphere. It will be appreciated that the electrolyte surface level will be slightly above the end of the anode bell 11.

In this arrangement, the receptacle was constructed of suitable material such as stainless steel and was approximately 6 inches in diameter, whereas the cathode holder 27 was constructed of a stainless steel tube 1½ inches in diameter with a disk of high purity niobium 0.005 inch thick.

Hydrogen was then introduced into the conduit 40 and after a suitable time the potential reading rose to a value of 0.385 volt and remained approximately at this level until the termination of the tests. Following the test, the cell was cooled and washed clean, and the niobium electrode was clean, bright and intact.

A second test was carried out in the apparatus of FIGURE 3 and under similar conditions as above described except that a quantity of lithium hydride, amounting to about 2% of the electrolyte bath weight was present. On commencing hydrogen flow, a potential of 0.230 volt was developed and remained at approximately this level until the termination of the tests.

Thus it will be appreciated that with my invention, I provide fuel cells having important applications in aircraft, missiles and related applications employing at least one gaseous reactant at one or both of the electrodes and producing efficient volt potentials. It will be appreciated that any number of cell units may be connected in electrical series to produce a desired voltage, and such arrangements are contemplated within the scope of the present invention.

Although various minor modifications might be suggested by those versed in the art, it should be understood that I wish to embody within the scope of the patent warranted hereon all such embodiments as reasonably and properly come within the scope of my contribution to the art.

I claim as my invention:

A lithium-hydrogen high temperature fuel cell comprising: a molten lithium halide electrolyte, a gaseous hydrogen electrode, and a lithium electrode, means to supply hydrogen gas to the hydrogen electrode, said hydrogen electrode having a solid niobium diaphragm, said solid diaphragm having a substantially uniform density that does not allow gases to be forced therethrough, and said niobium diaphragm being positioned between the molten electrolyte and the hydrogen supplied to permit the hydrogen to permeate the niobium diaphragm.

References Cited in the file of this patent

UNITED STATES PATENTS 2,913,511  Grubb _____ Nov. 17, 1959

OTHER REFERENCES

Status Report on Fuel Cells, United States Dept. of Commerce, Office of Technical Services. PB151804, pages 23 and 67, June 1959.

The Electrochemical Society, vol. 68, pages 449–468, 1935.